Oct. 25, 1966   E. J. ZAHURANEC   3,280,834
SLIDE VALVE

Filed Feb. 5, 1964   2 Sheets-Sheet 1

INVENTOR.
EMERY J. ZAHURANEC
BY
Fay & Fay
ATTORNEYS

Oct. 25, 1966  E. J. ZAHURANEC  3,280,834
SLIDE VALVE

Filed Feb. 5, 1964  2 Sheets-Sheet 2

INVENTOR.
EMERY J. ZAHURANEC
BY
*Fay & Fay*
ATTORNEYS

United States Patent Office 3,280,834
Patented Oct. 25, 1966

3,280,834
SLIDE VALVE
Emery J. Zahuranec, Solon, Ohio, assignor to Crawford Fitting Company, Cleveland, Ohio, a corporation of Ohio
Filed Feb. 5, 1964, Ser. No. 342,651
7 Claims. (Cl. 137—612.1)

This invention relates to valves and more particularly to a special slide valve adapted for use in connection with the calibration of instruments in a fluid line.

More specifically, the invention contemplates a slide valve arrangement which includes, in combination therewith, a valved female half of a quick connect coupling whereby a calibrating instrument may be readily connected to the slide valve.

Customary practice in the past has been to place a T connection in a line having a measuring instrument whereby a calibrating gauge could be connected to the T so that the instrument in the line might be calibrated. However, since calibrating instruments are relatively expensive, it has not been practical to provide a calibrating gauge for each instrument. Therefore, the T is ordinarily plugged and a shut-off valve is placed in the line. Whenever it is desired to calibrate the instrument, the valve is closed, isolating the instrument and T from the flow line, the plug is removed from the T and a calibrating gauge is placed in communication with the instrument. Once the gauge is connected to the T, fluid is introduced through the gauge and T to the instrument and the instrument is calibrated. Upon completion of the calibration, the reverse steps are followed with the calibrating gauge removed from the line, the T once again plugged and the valve reopened.

The improved slide valve combination of the instant invention obviates the need for the burdensome steps heretofore necessary. Thus, it is an object of this invention to provide an improved slide valve.

It is a further object of this invention to provide a slide valve which is usable for the calibration of instruments.

It is another object of this invention to provide a slide valve in combination with a quick connect coupling whereby a calibrating gauge may be placed in communication with an instrument in a fluid line.

It is a still further object of this invention to provide a slide valve combination which is adapted to perform the function of a T connection.

Other objects and a fuller understanding of the invention will appear as the description proceeds.

To the accomplishment of the foregoing and related ends, the following description sets forth in detail one approved means of carrying out the invention, such disclosed means are not meant to be limiting, constituting but one of the various ways in which the principles of the invention may be applied.

In the drawings wherein like reference numerals indicate like parts in the various views.

Figures 1, 2, 3:
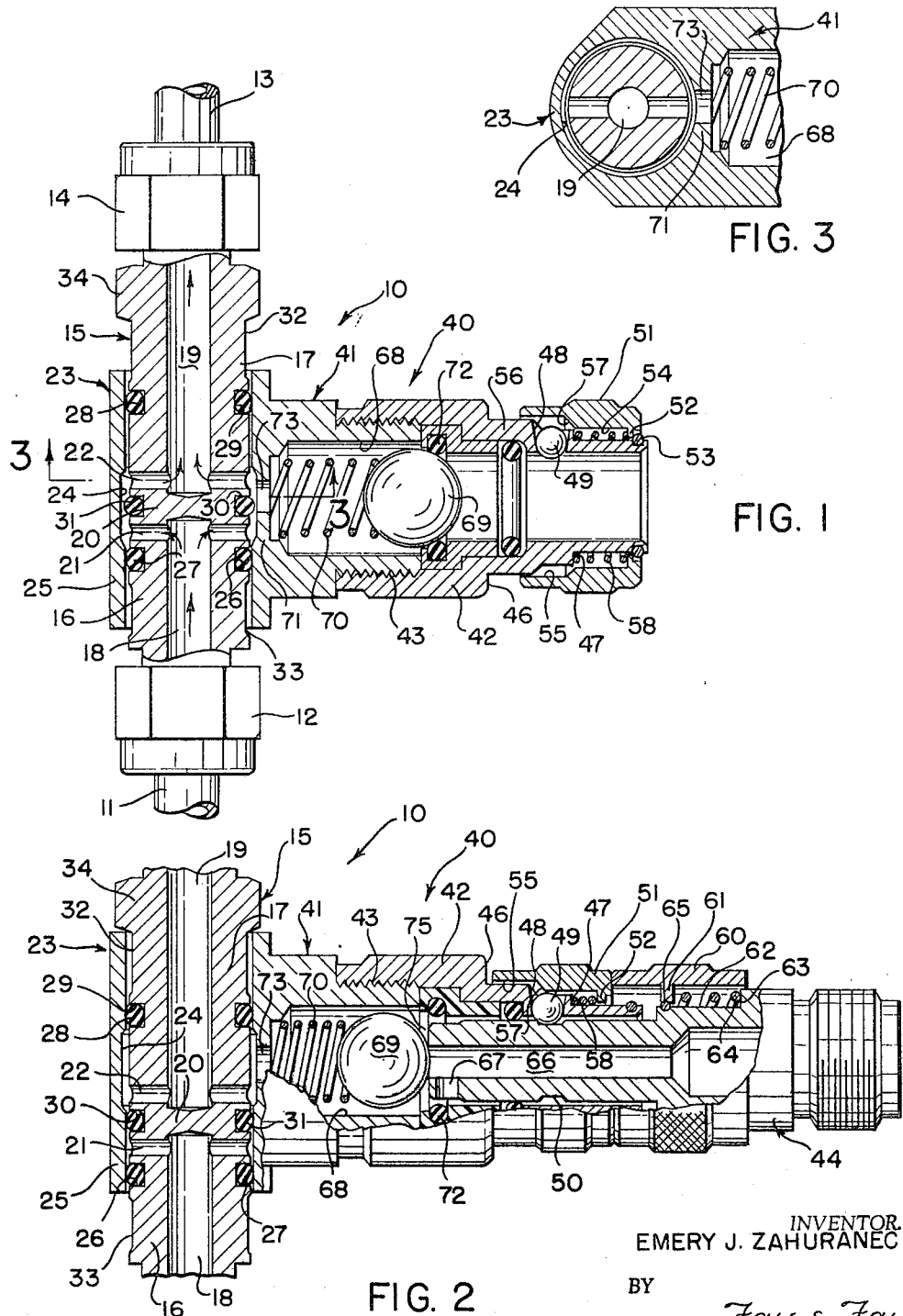
FIG. 1 is a longitudinal sectional view of the valve embodying the principles of the instant invention.
FIG. 2 is a view similar to FIG. 1 illustrating the male portion of the quick connect coupling secured to the female portion.
FIG. 3 is a sectional view taken along line 3—3 of FIG. 1.

Turning to the drawings and FIG. 1, there is illustrated a slide valve, indicated generally by the reference numeral 10, which is inserted in a flow line and secured to one end of a length of tubing 11 by a tube coupling 12 and at the other end to another length of tubing 13 by a similar tube coupling 14. The valve comprises a tubular body 15 which is divided into inlet and outlet sections 16, 17 respectively. Each of the inlet and outlet sections includes axially extending inlet and outlet passages 18 and 19 with a wall or partition 20 dividing the sections 16 and 17 and separating the passages 18 and 19.

A plurality of radial apertures 21 are provided in the external wall of the inlet section 16 immediately adjacent to the partition 20. Similarly, a plurality of radial apertures 22 are provided in the external wall of the outlet section 17 immediately adjacent to the partition 20. With the apertures 21 and 22 being in communication with the inlet and outlet passages 18 and 19, the radial apertures 21, 22 serve to direct the flow of fluid outwardly of and inwardly of the tubular body 15.

To control the inward and outward fluid flow, exterior of the body, there is provided a tubular sleeve 23 which is slidably received over the body 15. Intermediate the ends of the tubular sleeve and formed on the inner periphery thereof is an annular groove 24 which is constructed of an axial extent such that it is capable of bridging the two sets of apertures 21, 22. This relationship is illustrated in FIG. 1 and it may be seen that fluid entering inlet passage 18 is directed outwardly through the radial apertures 21 into the annular channel or groove 24 where it is then redirected inwardly of the body 15 through the radial apertures 22 and out through the outlet passage 19. To discontinue the flow of fluid through the valve, the sleeve 23 may be displaced longitudinally of the valve body 15 to a position illustrated in FIG. 2 wherein the radial ports or apertures 21 are blocked by the end 25 of the sleeve 23. In this position, fluid entering the annular groove 24 and passing on through the outlet passage 19.

To assure the proper sealing of the sleeve 23 relative to the valve body 15, there is provided a plurality of sealing rings which preferably are mounted and seated on the tubular body of the valve and arranged to engage the inner periphery of the slidable sleeve. To this end the inlet section 16 of the tubular body 15 includes an external annular groove 26 in which is disposed a resilient O-ring or sealing gasket 27. A similar O-ring 28 is provided in an annular groove 29 on the outlet section 17 of the valve body. The partition 20 is also provided with an annular groove 30 in which is received a resilient O-ring 31. It may be seen from an inspection of FIGS. 1 and 2 that the two O-rings 27 and 29 are in continuous contact with the inner periphery of the sleeve 23 thereby providing a liquid-proof seal for the operation of the valve. The O-ring 31, when the valve is in a fluid conducting position, is aligned with the annular groove 24 in the sleeve 23 and does not perform a sealing function. However, in the closed position of the valve, as illustrated in FIG. 2, the O-ring 31 engages the inner periphery of the end 25 on the sleeve 23 and serves to seal the radial apertures 21 from the apertures 22.

For convenience of operation of the valve, it is contemplated that appropriate indicia such as a color code might be provided in association with the valve thereby to facilitate the operation thereof. Thus, a color such as green might be placed on the external periphery of the valve body 15, such as at 32. A similar red indicia might be placed on the exterior of the body as at 33. With indicia of this sort, an operator of the slide valve would, when the valve is in the position of FIG. 1, note a green color exposed, with the red color being covered by the end 25 of the sleeve 23, and would thereby know that the valve was in the fluid conducting condition. Moving the slide valve 23 longitudinally of the valve body until it engages the abutment 34 would cover the green indicia and expose the red color and thereby indicate that the valve was in the closed position.

In combination with the slide valve 10, there is included a female portion of a quick connect coupling, indicated generally by the reference numeral 40. The coupling includes a body 41 which is secured to the sleeve 23. The body 41 has threadedly mounted on one end thereof a substantially tubular body extension portion 42 which may be integral with the coupling body or secured thereto by a threaded joint 43. A locking detent mechanism including a portion of the extension portion 42 is provided for cooperation with the tubular stem 44 of the male half of the quick connect coupling thereby to permit the female coupling body 41 to be locked and sealed on the male section. The extension 42 is provided on the external periphery thereof with an enlarged intermediate or central portion which defines a pair of axially spaced, external radial shoulders 46, 47. The extension 42 at the central portion has a plurality of radially tapered, detent ball receiving openings 48 with each opening being frusto-conical in shape and having a minimum diameter less than the diameter of ball detents 49 disposed therein thereby permitting the balls to project slightly into the bore of the tubular extension 42.

The extent of the projection of the balls 49 into the bore of the extension 42 is such that they are adapted to engage a groove 50 formed on the tubular portion 44 of the male stem. To retain the ball detents 49 within the openings 48, a sleeve 51 is provided on the body which has a radially inwardly directed flange 52 positioned adjacent the end of the body extension portion 42 and in abutting relationship with a retaining ring 53 secured to such portion. The sleeve 51 has a bore portion 54 adjacent the flange 52 which is slightly larger in diameter than the ball detent receiving portion of the extension 42 for slidable clearance thereover in the area of the ball detent openings 48. An enlarged bore 55 is provided in the sleeve 51 adjacent the end opposite the flange 52 for clearance of a slightly enlarged area 56 on the extension 42. Between the sleeve bores 54, 55 is a tapered camming surface 57 which acts to cam the ball detents 49 into or out of engagement with the groove 50 as the sleeve 51 is displaced longitudinally of the extension 42. When the sleeve 51 is displaced longitudinally of the extension 42 from the position shown in FIG. 1, the cam surface 57 cams the ball detents 49 radially inwardly and the bore 54 retains the detents in a radially inward position. When the sleeve 51 is in a position such that the flange 52 abuts the retaining ring 53, the sleeve bore 55 forms a releasing cavity in which the ball detents may retract radially outward from engagement with the groove 50. A coil spring 58, FIG. 1, is provided normally to urge the sleeve 51 into a position wherein the flange 52 engages the ring 53 and the ball detents are free to be displaced radially outward.

On the stem 44 of the male member there is provided a stem sleeve 60 having a radial flange 61 in close engagement with an enlarged portion 62 of the stem 44. The enlarged portion 62 has a radially outwardly directed shoulder 63 with a coil spring 64 being interposed between the shoulder 63 and the flange 61 thereby biasing the sleeeve to a position wherein the flange 61 engages a retaining ring 65. The coil spring 64 is of greater strength than the spring 58 which biases the sleeve 51 on the female section of the quick connect coupling. The stem 44 further includes a longitudinally extending fluid passage 66 which passes through the stem. Adjacent the inner end of the stem 44 and in communication with the passage 66 is a plurality of radial ports 67 which pass radially outwardly of the stem.

Returning to the female portion of the quick connect 40, it may be seen that there is provided in the body member 41 a central chamber 68 in which there is received a ball 69. A spring 70 interposed between one wall 71 of the body member 41 and the ball 69 biases the ball longitudinally of the cavity into a position wherein it abuts a sealing O-ring 72 carried by the body 41. At the end of the cavity 68 opposite to the ball 69, there is a radial aperture 73 passing through the sleeve 23 and in communication with the annular channel or groove 24 formed therein.

In coupling the stem 44 of the male member to the female body member 41, the stem 44 is moved into the bore of the body extension 42 and slid axially thereof until the sleeve 60 abuts the sleeve 51. As the axial advance of the stem into the bore of the female body continues, the greater force of the spring 64 overcomes the biasing effect of the spring 58 and axially displaces the sleeve 51. Thus, as the groove 50 in the stem 44 approaches radial alignment with the openings 48, the cam surface 57 on the sleeve 51 engages the ball detents 49 and effects a radially inward camming force on the ball detents. This radially directed inward force occurs just at the time the groove 50 is aligned with the openings 48 and the ball detents are cammed into engagement with the groove 50. The bore 54 overrides the detents 49 and effects a locking of the ball members into the groove 50 thereby preventing withdrawal of the stem 44 from the female body member. Simultaneous with the locking action of the ball detents and the stem 44, the end 75 of the stem 44 abuts the ball 69 and displaces the ball 69 from its sealing engagement with the seal 72 against the bias of the spring 70 into a position illustrated in FIG. 2. In this position, fluid introduced through the threaded connection of the male member into the passage 66 will pass outwardly of the radial apertures 67 into the cavity 68. Fluid in the cavity 68 is in communication through the radial port 73 with the annular groove 24 in the sleeve 23. As illustrated in FIG. 2, any fluid present in the cavity 68 would pass through the radial port 73 into the channel 24 and thereafter through the radial apertures 22 into the outlet passage 19 of the valve 10 and thereafter proceed outwardly of the valve combination through the tube 13.

It is believed apparent upon an inspection of the disclosed device that there is provided a slide valve arrangement 10 wherein flow between the tubing 11 and 13 may be controlled in a selected manner. There is also provided in the combination a coupling means whereby an alternative source of fluid may be connected with the slide valve in the manner of a T connection.

Figure 4:
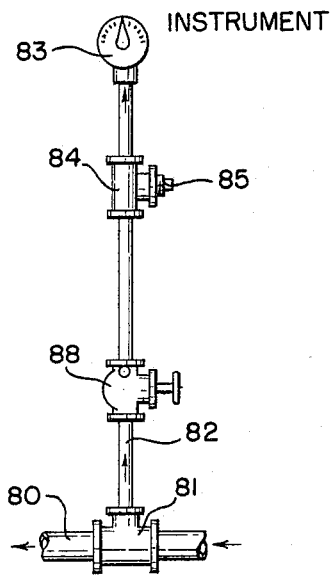
FIG. 4 is a schematic illustration of a typical prior art insrtument setup.
Figure 5:
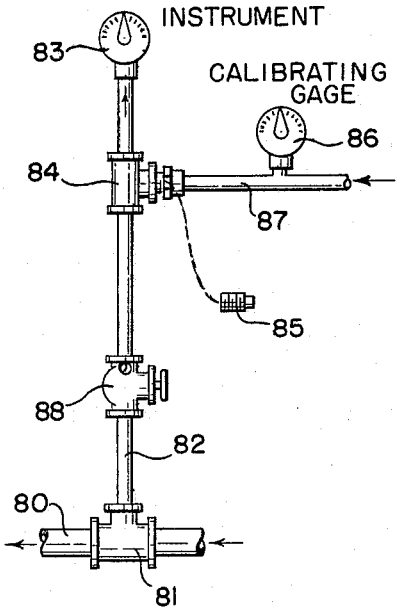
FIG. 5 is a view similar to FIG. 4 showing schematically the calibration of an instrument in a typical prior art setup.

The advantage of the arrangement above-described is best understood in the context of the particular problem which it is designed to remedy. Thus, turning to FIGS. 4 and 5, there is illustrated in schematic form a typical instrumentation setup. The setup includes the main fluid line 80 having a T 81 and a line 82 tapped from the T and adapted to supply an instrument 83 for measuring certain conditions of the fluid in the line 80. To provide a means for calibrating the instrument 83, it was heretofore necessary to interpose in the line 82 a shut-off valve 88 and a T 84 having a plug 85. When it was desired to calibrate the instrument 83, the plug 85 was removed as shown in FIG. 5 and the valve 88 was closed thereby isolating the instrument 83 from the main flow line 80. With the plug 85 removed from the T 84, a calibrating gauge 86 having a fluid line 87 was connected to the T 84 and a source of fluid pressure was applied through the calibrating gauge 86, through the T 84 to the instrument 83 whereby the accuracy of the instrument 83 could be ascertained. Once the instrument 83 was calibrated, the reverse steps were followed and the gauge 86 was removed from the line, the T 84 was plugged, the valve 88 was again opened and the instrument 83 was ready to perform its normal operation.

Figure 6:
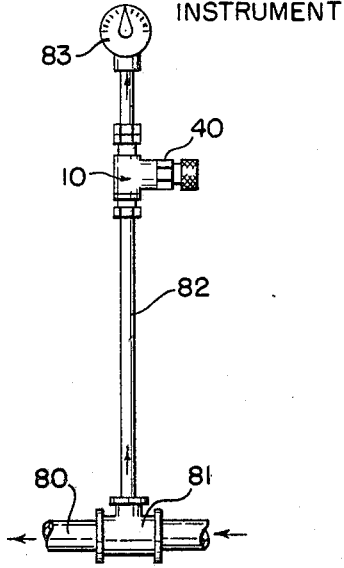
FIG. 6 is a schematic illustration of an instrumentation setup embodying the principles of the instant invention.
Figure 7:
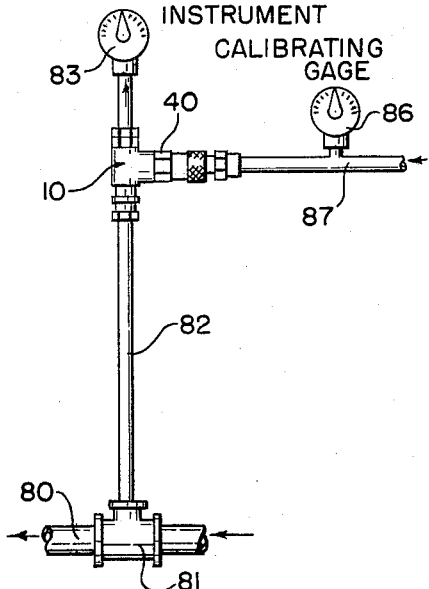
FIG. 7 is a schematic illustration similar to FIG. 6 showing schematically the calibration of an instrument.

To obviate the need for the multiplicity of fittings and reduce the time and effort required to calibrate an instrument, the device described hereinabove may be used as illustrated in FIGS. 6 and 7. Thus, in lieu of the valve 88 and the T 84 there is placed in the line 82 the valve combination illustrated in FIG. 1. When it is desired to calibrate the instrument 83, the technician need only insert in the coupling 40 secured to the valve 10 the male member of a quick connect coupling and the calibrating gauge is interconnected with the line. The slide valve 10 accomplishes the same function as the valve 88 in that, by displacing the valve to the position shown in FIG. 2, flow from the main supply line 80 is discontinued to the instrument 83. With the calibrating gauge connected to the coupling 40, fluid introduced in the line 87 will be supplied to the instrument 83. When the instrument 83 has been properly calibrated, the male member of the coupling is removed from the coupling 40 and the slide valve is returned to its original position wherein the fluid from the main supply line 80 is in communication with the instrument 83.

It is, of course, to be understood that the valve hereinabove described is not limited in its use to the particular setup illustrated in FIGS. 6 and 7. The valve might be used as a T connection in diverse environments and the operation of the valve might be reversed such that the passages 66 and 18 are brought into communication instead of passages 66 and 19.

For purposes of description, the principles of the invention have been set forth in connection with but a single illustrated embodiment. It is not my intention that the illustrated embodiment or the terminology employed in describing it be limiting inasmuch as variations in these may be made without departing from the spirit of the invention, but rather, it is my desire to be restricted only by the scope of the appended claims.

I claim:
1. A valve combination comprising:
   a longitudinally extending body;
   valve means movably carried by said body inlet and outlet passages in said body;
   said valve means including means cooperating with said inlet and outlet passages for controlling the flow of fluid from said inlet passage to said outlet passage;
   a third passage formed in said valve means angularly disposed relative to said inlet and outlet passages;
   flow control means in said third passage;
   movement of said valve means on said body controlling the communication of said third passage with said inlet and outlet passages.
2. A valve combination comprising a longitudinally extending body:
   inlet and outlet passages in said body;
   means carried by said body defining a third passage angularly disposed relative to said inlet and outlet passages;
   said means defining said third passage being movably mounted on said body whereby said third passage may be selectively brought into communication with said inlet passage, said outlet passage, or both of said inlet and outlet passages; and
   flow control means movable in said third passage.

3. A valve combination comprising:
   a tubular body having longitudinally extending inlet and outlet passages;
   partition means in said body blocking communication of said inlet and outlet passages;
   radially extending aperture means formed in the walls of said body on opposite sides of said partition;
   a sleeve slidably mounted on said tubular body;
   an annular groove in the inner periphery of said sleeve of an extent sufficient to overlie the radial apertures on opposite sides of the partition in one position of the sleeve;
   an auxiliary passage defining means secured to said sleeve, with the passage in said auxiliary means being angularly disposed relative to said inlet and outlet passages;
   flow control means in said auxiliary passage; and
   a radial port in said sleeve interconnecting said auxiliary passage with said annular groove.
4. The combination of claim 3 including tube coupling means associated with said passage defining means.
5. A valve combination comprising:
   a tubular body having longitudinally extending inlet and outlet passages;
   partition means in said body blocking communication of said inlet and outlet passages;
   aperture means extending radially from said passages through the walls of said body on opposite sides of said partition;
   a sleeve slidably mounted on said tubular body;
   an annular groove in the inner periphery of said sleeve of an extent sufficient to overlie the radial apertures on opposite sides of the partition in one position of the sleeve;
   coupling means secured to said sleeve adapted to connect a fluid line with said sleeve;
   a fluid passage in said coupling means; and
   a radial port in the annular groove of said sleeve interconnecting said fluid passage in said coupling means with said annular groove.
6. The combination of claim 5 wherein said coupling means includes flow in control means in said fluid passage.
7. The combination of claim 5 wherein said coupling means comprises the female portion of a ball detent quick-connect coupling.

References Cited by the Examiner

UNITED STATES PATENTS

| | | | |
|---|---|---|---|
| 970,225 | 9/1910 | Holden | 251—344 X |
| 1,944,739 | 1/1934 | Hunt | 137—625.68 |
| 2,727,761 | 12/1955 | Elliott et al. | 137—625.68 X |
| 2,906,492 | 9/1959 | Conrad | 251—325 |
| 3,106,378 | 10/1963 | Hellstern | 251—344 X |

FOREIGN PATENTS

| | | |
|---|---|---|
| 574,179 | 12/1945 | Great Britain. |
| 179,854 | 5/1922 | Great Britain. |
| 118,640 | 7/1944 | Australia. |
| 1,150,154 | 8/1957 | France. |

M. CARY NELSON, *Primary Examiner.*

S. SCOTT, *Assistant Examiner.*